US009813392B2

United States Patent
Lorenz et al.

(10) Patent No.: US 9,813,392 B2
(45) Date of Patent: Nov. 7, 2017

(54) APPARATUS AND METHOD FOR PROVIDING A PUBLIC KEY FOR AUTHENTICATING AN INTEGRATED CIRCUIT

(71) Applicant: QUALCOMM Incorporated, San Diego, CA (US)

(72) Inventors: Dean Lorenz, Haifa (IL); Boris Dolgunov, Ramatt-Gan (IL); Roberto Avanzi, Munich (DE); Ivan Hugh Mclean, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 14/640,687

(22) Filed: Mar. 6, 2015

(65) Prior Publication Data

US 2016/0261565 A1    Sep. 8, 2016

(51) Int. Cl.
*H04L 29/06* (2006.01)
*H04L 9/08* (2006.01)
*H04L 9/32* (2006.01)

(52) U.S. Cl.
CPC .......... *H04L 63/045* (2013.01); *H04L 9/0866* (2013.01); *H04L 9/0877* (2013.01); *H04L 9/0897* (2013.01); *H04L 9/3236* (2013.01); *H04L 9/3263* (2013.01); *H04L 63/0421* (2013.01); *H04L 63/061* (2013.01); *H04L 63/0876* (2013.01)

(58) Field of Classification Search
CPC . H04L 63/045; H04L 63/0421; H04L 63/061; H04L 63/0876
See application file for complete search history.

(56) References Cited

U.S. PATENT DOCUMENTS

| 7,269,726 | B1 | 9/2007 | Corella |
| 7,475,812 | B1 | 1/2009 | Novozhenets et al. |
| 8,495,361 | B2 | 7/2013 | Catherman et al. |
| 8,843,764 | B2 | 9/2014 | Hussain |
| 2004/0250077 | A1* | 12/2004 | Jang ................... G06Q 20/1235 713/175 |

(Continued)

FOREIGN PATENT DOCUMENTS

WO    WO-03073688 A1    9/2003

OTHER PUBLICATIONS

International Search Report and Written Opinion—PCT/US2016/016954 ISA/EPO—May 2, 2016.

*Primary Examiner* — Michael Pyzocha
*Assistant Examiner* — Mary Li
(74) *Attorney, Agent, or Firm* — Loza & Loza, LLP

(57) ABSTRACT

Disclosed is a method for providing a public key for authenticating an integrated circuit. In the method, the integrated circuit obtains a hardware key and an integrated circuit identifier. The integrated circuit generates a derived key based on the hardware key using a key derivation function (KDF) shared with a manufacturing machine. The integrated circuit generates a private key and a corresponding public key using the derived key as an input to a deterministic function. The integrated circuit then provides the public key and the integrated circuit identifier to a partner service for authentication of the integrated circuit using an anonymized credential database to be provided to the partner service by a manufacturer.

15 Claims, 5 Drawing Sheets

(56) References Cited

U.S. PATENT DOCUMENTS

| | | |
|---|---|---|
| 2005/0144440 A1 | 6/2005 | Catherman et al. |
| 2006/0150241 A1 | 7/2006 | Huh et al. |
| 2008/0313475 A1 | 12/2008 | Malcolm |
| 2009/0204815 A1 | 8/2009 | Dennis et al. |
| 2009/0319802 A1 | 12/2009 | Walmsley |
| 2011/0039592 A1 | 2/2011 | Haddad et al. |
| 2011/0191599 A1 | 8/2011 | Chou et al. |
| 2012/0331287 A1 | 12/2012 | Bowman et al. |
| 2012/0331526 A1* | 12/2012 | Caudle ............... G06F 21/6209 726/4 |
| 2013/0013916 A1 | 1/2013 | Brown |
| 2013/0166920 A1 | 6/2013 | Cousins et al. |
| 2014/0205092 A1 | 7/2014 | Hartley et al. |
| 2014/0258736 A1 | 9/2014 | Merchan et al. |
| 2014/0365763 A1 | 12/2014 | Manohar et al. |
| 2015/0143125 A1 | 5/2015 | Nix |

* cited by examiner

FIG. 6
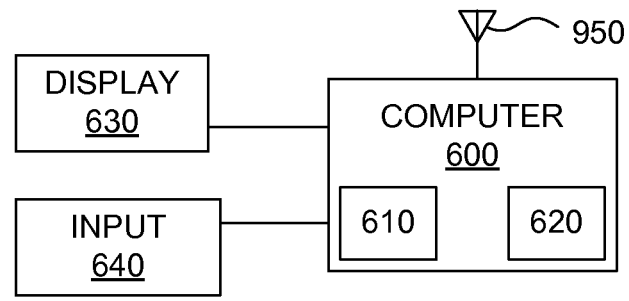
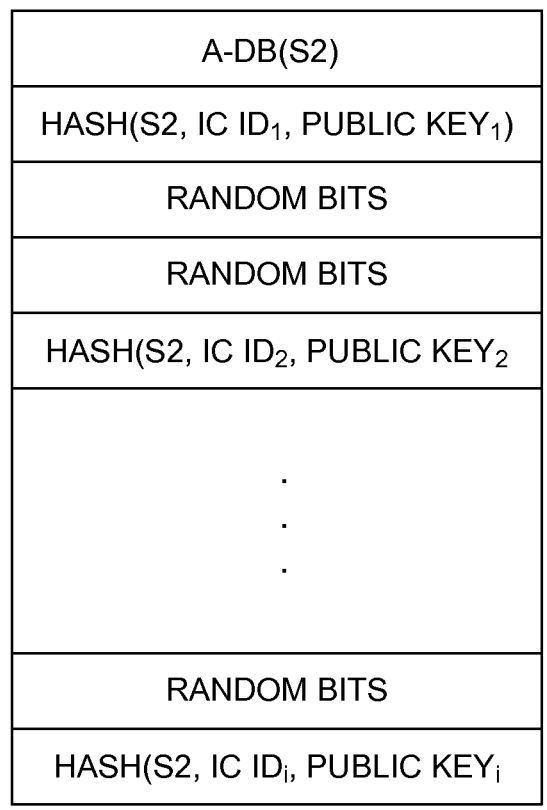
FIG. 7

APPARATUS AND METHOD FOR PROVIDING A PUBLIC KEY FOR AUTHENTICATING AN INTEGRATED CIRCUIT

BACKGROUND

Field

The present invention relates generally to authenticating an integrated circuit.

Background

The identity of an integrated circuit/system-on-a-chip (SoC) is known during manufacture, but after a device leaves the factory, it is a challenge to truly verify the identity of an SoC. The SoC may have a randomly generated hardware (HW) key set in fuses during manufacture (before integration in a device.). The HW key is accessible only to a trusted platform module (TPM) of the SoC.

A partner service may desire to securely identify and authenticate the SoC as a trusted device. However, the manufacturer of the SoC may not be willing to add or dedicate fuses for the partner service. In addition, the manufacturer is generally unwilling to reveal the HW key or reveal manufacturing details to the partner service. Also, the manufacturer desires to limit the number of time-consuming steps required during the manufacture of the SoC.

There is therefore a need for a technique for allowing a partner service to authenticate an integrated circuit/SoC without exposing sensitive information.

SUMMARY

An aspect of the present invention may reside in a method for providing a public key for authenticating an integrated circuit. In the method, the integrated circuit obtains a hardware key and an integrated circuit identifier. The integrated circuit generates a derived key based on the hardware key using a key derivation function (KDF) shared with a manufacturing machine. The integrated circuit generates a private key and a corresponding public key using the derived key as an input to a deterministic function. The integrated circuit then provides the corresponding public key and the integrated circuit identifier to a partner service for authentication of the integrated circuit using an anonymized credential database to be provided to the partner service by a manufacturer.

In more detailed aspects of the invention, the private key and the corresponding public key may be generated further using a partner salt as an input to the deterministic function. Also, the hardware key may be only known to a secure zone of the integrated circuit and to the manufacturing machine.

Another aspect of the invention may reside in an integrated circuit, comprising: means for obtaining a hardware key and an integrated circuit identifier; means for generating a derived key based on the hardware key using a key derivation function (KDF) shared with a manufacturing machine; means for generating a private key and a corresponding public key using the derived key as an input to a deterministic function; and means for providing the corresponding public key and the integrated circuit identifier to a partner service for authentication of the integrated circuit using an anonymized credential database to be provided to the partner service by a manufacturer.

Another aspect of the invention may reside in an integrated circuit, comprising: a processor configured to: obtain a hardware key and an integrated circuit identifier; generate a derived key based on the hardware key using a key derivation function (KDF) shared with a manufacturing machine; generate a private key and a corresponding public key using the derived key as an input to a deterministic function; and provide the corresponding public key and the integrated circuit identifier to a partner service for authentication of the integrated circuit using an anonymized credential database to be provided to the partner service by a manufacturer.

Another aspect of the invention may reside in a computer-readable medium, comprising: code for causing a computer to obtain a hardware key and an integrated circuit identifier; code for causing a computer to generate a derived key based on the hardware key using a key derivation function (KDF) shared with a manufacturing machine; code for causing a computer to generate a private key and a corresponding public key using the derived key as an input to a deterministic function; and code for causing a computer to provide the corresponding public key and the integrated circuit identifier to a partner service for authentication of an integrated circuit using an anonymized credential database to be provided to the partner service by a manufacturer.

Another aspect of the invention may reside in a method for providing an anonymized credential database for a plurality of integrated circuits, comprising: for each integrated circuit of the plurality of integrated circuits; receiving, by a manufacturer, a derived key and an integrated circuit identifier from a manufacturing machine, wherein the derived key was generated by the manufacturing machine based on a hardware key of the integrated circuit, and using a key derivation function (KDF) shared with the integrated circuit; generating, by the manufacturer, a private key and a corresponding public key using the derived key as an input to a deterministic function; generating, by the manufacturer, an anonymized credential for the integrated circuit based on a hash of the integrated circuit identifier and the corresponding public key; and storing, by the manufacturer, the anonymized credential in the anonymized credential database.

In more detailed aspects of the invention, the method may further comprise: providing the anonymized credential database to a partner service for authenticating a public key provided to the partner service by an integrated circuit, and discarding, by the manufacturer, each private key before providing the anonymized credential database. Also, the private key and the corresponding public key may be generated further using a partner salt as an input to the deterministic function. The hardware key may be only known to a secure zone of the integrated circuit and to the manufacturing machine. A database distinguishing salt may be included in the hash used to generate the anonymized credential.

Another aspect of the invention may reside in a station, comprising: means for receiving a derived key and an integrated circuit identifier from a manufacturing machine for each integrated circuit of a plurality of integrated circuits, wherein the respective derived key was generated by the manufacturing machine based on a hardware key of the respective integrated circuit, and using a key derivation function (KDF) shared with the integrated circuits; means for generating a respective private key and a corresponding respective public key using the respective derived key as an input to a deterministic function; means for generating an anonymized credential for the respective integrated circuit based on a hash of the respective integrated circuit identifier and the respective public key; and means for storing the respective anonymized credential for each integrated circuit in an anonymized credential database.

Another aspect of the invention may reside in a station, comprising: a processor configured to: receive a derived key and an integrated circuit identifier from a manufacturing machine for each integrated circuit of a plurality of integrated circuits, wherein the respective derived key was generated by the manufacturing machine based on a hardware key of the respective integrated circuit, and using a key derivation function (KDF) shared with the integrated circuits; generate a respective private key and a corresponding respective public key using the respective derived key as an input to a deterministic function; generate an anonymized credential for the respective integrated circuit based on a hash of the respective integrated circuit identifier and the respective public key; and store the respective anonymized credential for each integrated circuit in an anonymized credential database.

Another aspect of the invention may reside in a computer-readable medium, comprising: code for causing a computer to receive a derived key and an integrated circuit identifier from a manufacturing machine for each integrated circuit of a plurality of integrated circuits, wherein the respective derived key was generated by the manufacturing machine based on a hardware key of the respective integrated circuit, and using a key derivation function (KDF) shared with the integrated circuits; code for causing a computer to generate a respective private key and a corresponding respective public key using the respective derived key as an input to a deterministic function; code for causing a computer to generate an anonymized credential for the respective integrated circuit based on a hash of the respective integrated circuit identifier and the respective public key; and code for causing a computer to store the respective anonymized credential for each integrated circuit in an anonymized credential database.

BRIEF DESCRIPTION OF THE DRAWINGS

FIG. 6 is a block diagram of computer including a processor and a memory.

FIG. 7 is a diagram of an anonymized credential database for a plurality of integrated circuits.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 2:
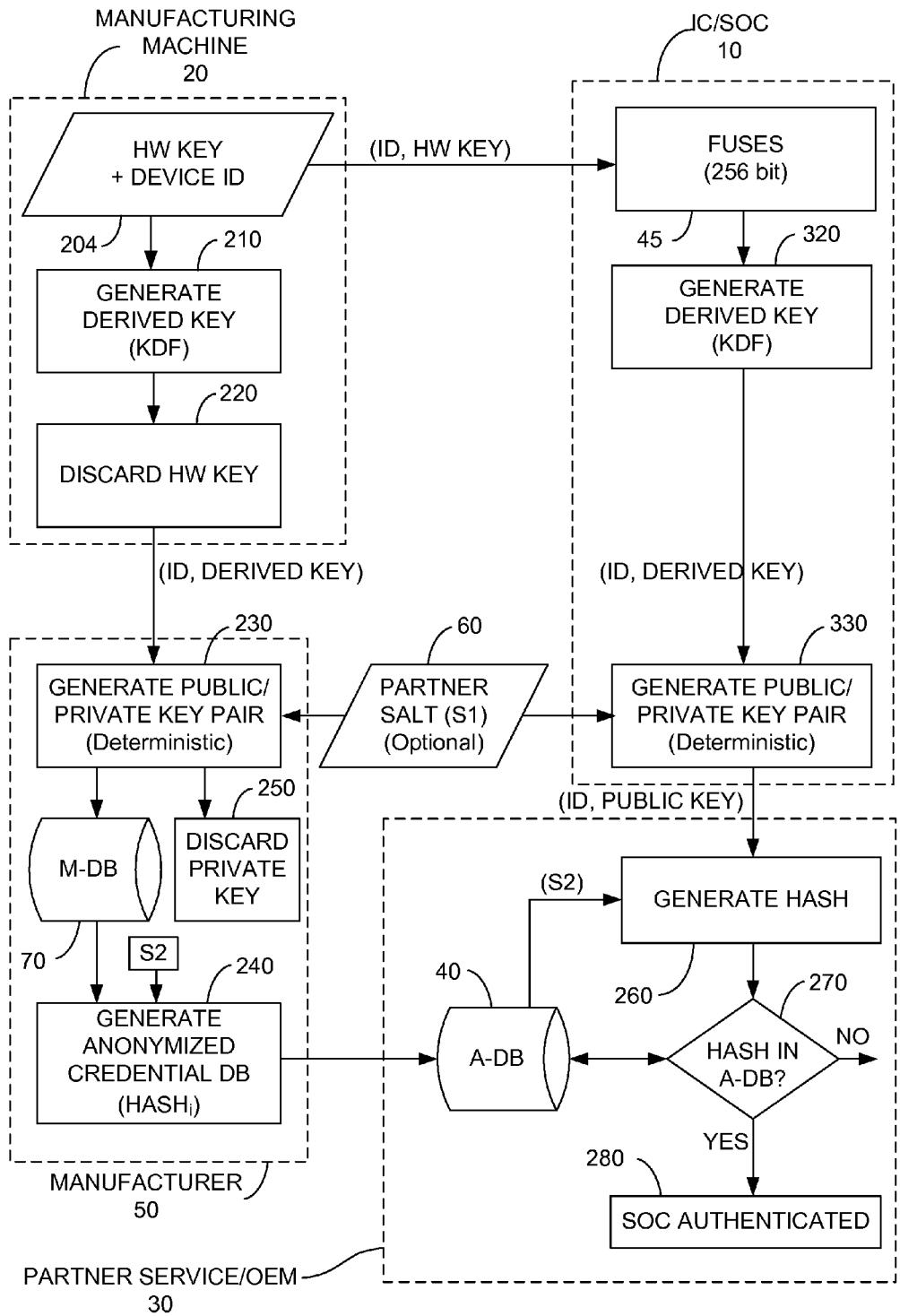
FIG. 2 is a flow diagram of a method for generating an anonymized credential database at a manufacturer for allowing a partner service to authenticate an integrated circuit based on an integrated circuit identifier and a public key.
Figure 3:
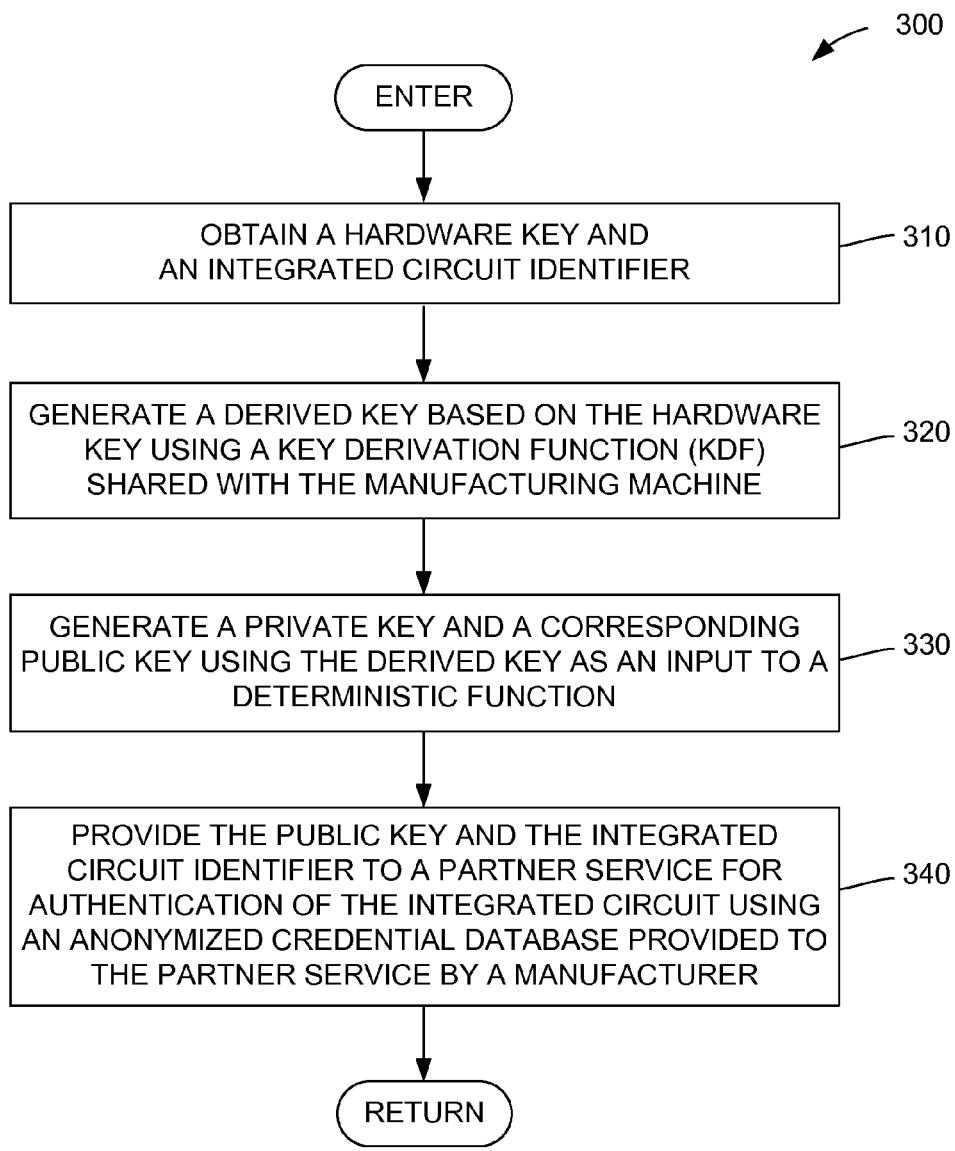
FIG. 3 is a flow diagram of a method for providing a public key for authenticating an integrated circuit, according to the present invention.

With reference to FIGS. 2 and 3, an aspect of the present invention may reside in a method 300 for providing a public key for authenticating an integrated circuit/system-on-a-chip (SoC) 10. In the method, the integrated circuit obtains a hardware (HW) key and an integrated circuit identifier (ID) (step 310). The integrated circuit generates a derived key based on the hardware key using a key derivation function (KDF) shared with a manufacturing machine 20 (step 320). The integrated circuit generates a private key and a corresponding public key using the derived key as an input to a deterministic function (step 330). The integrated circuit then provides the public key and the integrated circuit identifier to a partner service 30 for authentication of the integrated circuit using an anonymized credential database (DB) 40 to be provided to the partner service by a manufacturer 50 (step 340).

In more detailed aspects of the invention, the private key and the corresponding public key may be generated further using a partner salt 60 as an input to the deterministic function. Also, the hardware key may be only known to a secure zone of the integrated circuit 10 and to the manufacturing machine 20. The manufacturing machine may generate the hardware key (i.e., step 204), and the integrated circuit may receive the hardware key from the manufacturing machine, as shown in FIG. 2. Alternatively, the integrated circuit may generate the hardware key and forward the hardware key to the manufacturing machine (not shown). Similarly, the integrated circuit may receive the integrated circuit identifier from the manufacturing machine (FIG. 2) or, alternatively, the integrated circuit may have an embedded integrated circuit identifier which it forwards to the manufacturing machine.

During manufacture, the HW key and the IC ID of the integrated circuit 10 may be stored in fuses 45. The manufacturing machine 20 generates the derived key using the HW key as an input to the same KDF as was used by the integrated circuit (step 210). The manufacturing machine discards the HW key (step 220), and forwards the derived key and the IC ID to the manufacturer (supplier) 50. Thus, the derived key is shared by only the integrated circuit, the manufacturing machine, and a secure facility computer of the manufacturer, and eventually may be discarded by the manufacturing machine. Both the manufacturer and the SoC deterministically generate a public/private key pair using the derived key as a seed (steps 230 and 330). An optional first or partner salt value (S1) 60 may be included in the seed to generate partner specific key pairs (and DBs). The manufacturer keeps an internal database M-DB 70 of the IC IDs and corresponding public keys. The manufacturer calculates a hash of the IC ID, the public key, and a second salt value (S2), and includes the hash in the DB to generate an anonymized credential DB (A-DB) (step 240). The A-DB is shown in FIG. 7. The private key may be discarded (step 250). The anonymized credential DB is forwarded to the partner service 30. Each time the internal database M-DB of the IC IDs/public keys is updated, or at periodic intervals, the manufacturer creates a new (fresh) second salt (S2), and creates an updated A-DB by calculating updated hash values (HASH(salt2, IC $ID_i$, Public $Key_i$), where i is an index number of the ICs). The IC ID may be the serial number, batch number, or model number of the integrated circuit. Also, the order of the values input to the hash function may be in any preset order. The A-DB of hash values may be padded using, e.g., random bits as shown in FIG. 7, to obscure the number of valid hash values, and then the A-DB is forwarded to the partner service along with the second salt (public information). The second salt may be set to a null value if its use is not desired.

The partner service 30 requests the IC ID and public key from the integrated circuit 10, and calculates a hash of the received IC ID and public key. The partner service inquires whether the calculated hash value is in the anonymized credential DB (step 270). If the hash is in the anonymized DB 40, the IC/SoC is authenticated (step 280). Otherwise, the authentication fails. False entries may be included in the anonymized credential DB to hide the number entries. Alternatively, Bloom filters may be used for the anonymized credential DB.

The method of the invention avoids additional fuses or pushing credentials onto the integrated circuit 10 during manufacturing, and the HW key never leaves the manufacturing machine 20. The derived key and the public/private keys may be derived/generated after the integrated circuit is integrated in a device. The integrated circuit may include a secure zone (e.g., trustzone (TZ) of the ARM architecture) and the authentication verifies that the end-point of its secure communications is in the TZ and is not in a higher level operating system (HLOS). The hash stored by the credential DB is much shorter than the corresponding key(s), and does not place at the risk the security of the key(s). A partner specific salt 60 means that the compromised keys of one partner service 30 will not compromise the security of other partners. Each partner needs to interact only with the integrated circuit for ID verification.

Figure 1:
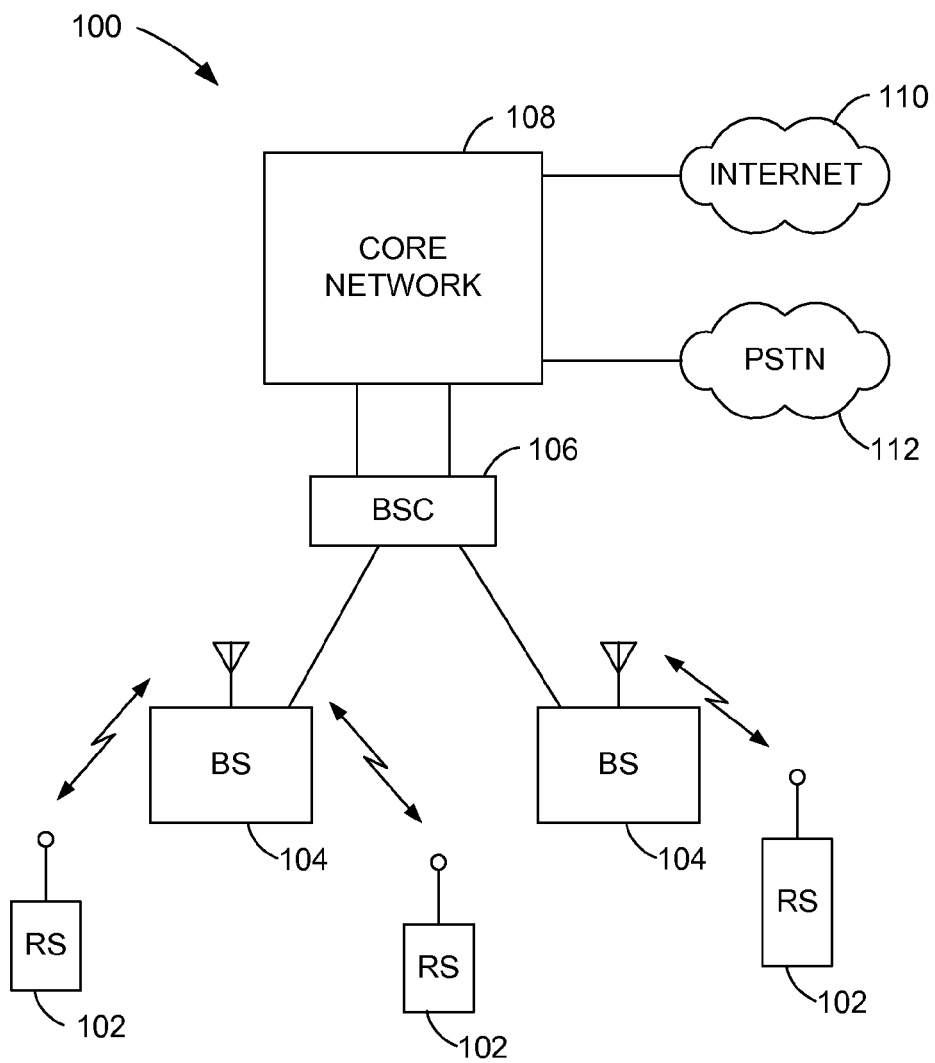
FIG. 1 is a block diagram of an example of a wireless communication system.
Figure 5:
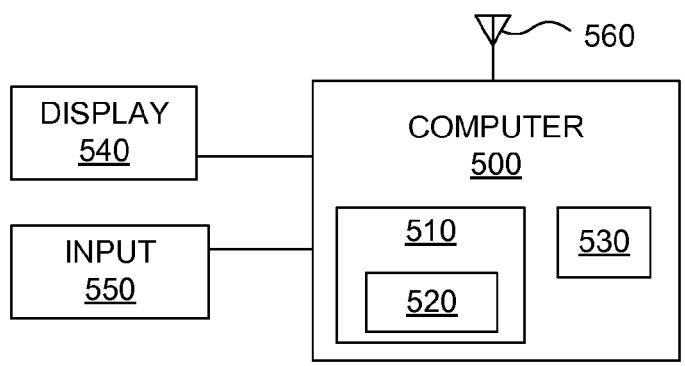
FIG. 5 is a block diagram of a computer including a memory and a processor with a trusted platform.

The IC/SoC 10 may be integrated into a remote station 102 (FIG. 1). With additional reference to FIG. 5, the remote station 102 may comprise a computer 500 that includes a processor 510 of hardware having a TPM 520, a storage medium 530 such as memory, a display 540, and an input such as a keypad 550, and a wireless connection 860. The IC/SoC 10 may comprise the processor and the storage medium.

Another aspect of the invention may reside in an integrated circuit 10, comprising: means (e.g., processor 510) for obtaining a hardware key and an integrated circuit identifier; means (e.g., processor 510) for generating a derived key based on the hardware key using a key derivation function (KDF) shared with a manufacturing machine 20; means (e.g., processor 510) for generating a private key and a corresponding public key using the derived key as an input to a deterministic function; and means (e.g., processor 510) for providing the public key and the integrated circuit identifier to a partner service 30 for authentication of the integrated circuit using an anonymized credential database to be provided to the partner service by a manufacturer 50.

Another aspect of the invention may reside in an integrated circuit 10, comprising: a processor 510 configured to: obtain a hardware key and an integrated circuit identifier; generate a derived key based on the hardware key using a key derivation function (KDF) shared with a manufacturing machine 20; generate a private key and a corresponding public key using the derived key as an input to a deterministic function; and provide the public key and the integrated circuit identifier to a partner service 30 for authentication of the integrated circuit using an anonymized credential database to be provided to the partner service by a manufacturer 50.

Another aspect of the invention may reside in a computer-readable medium 530, comprising: code for causing a computer 500 to obtain a hardware key and an integrated circuit identifier; code for causing a computer 500 to generate a derived key based on the hardware key using a key derivation function (KDF) shared with a manufacturing machine 20; code for causing a computer 500 to generate a private key and a corresponding public key using the derived key as an input to a deterministic function; and code for causing a computer 500 to provide the public key and the integrated circuit identifier to a partner service 30 for authentication of an integrated circuit using an anonymized credential database to be provided to the partner service by a manufacturer 50.

Figure 4:
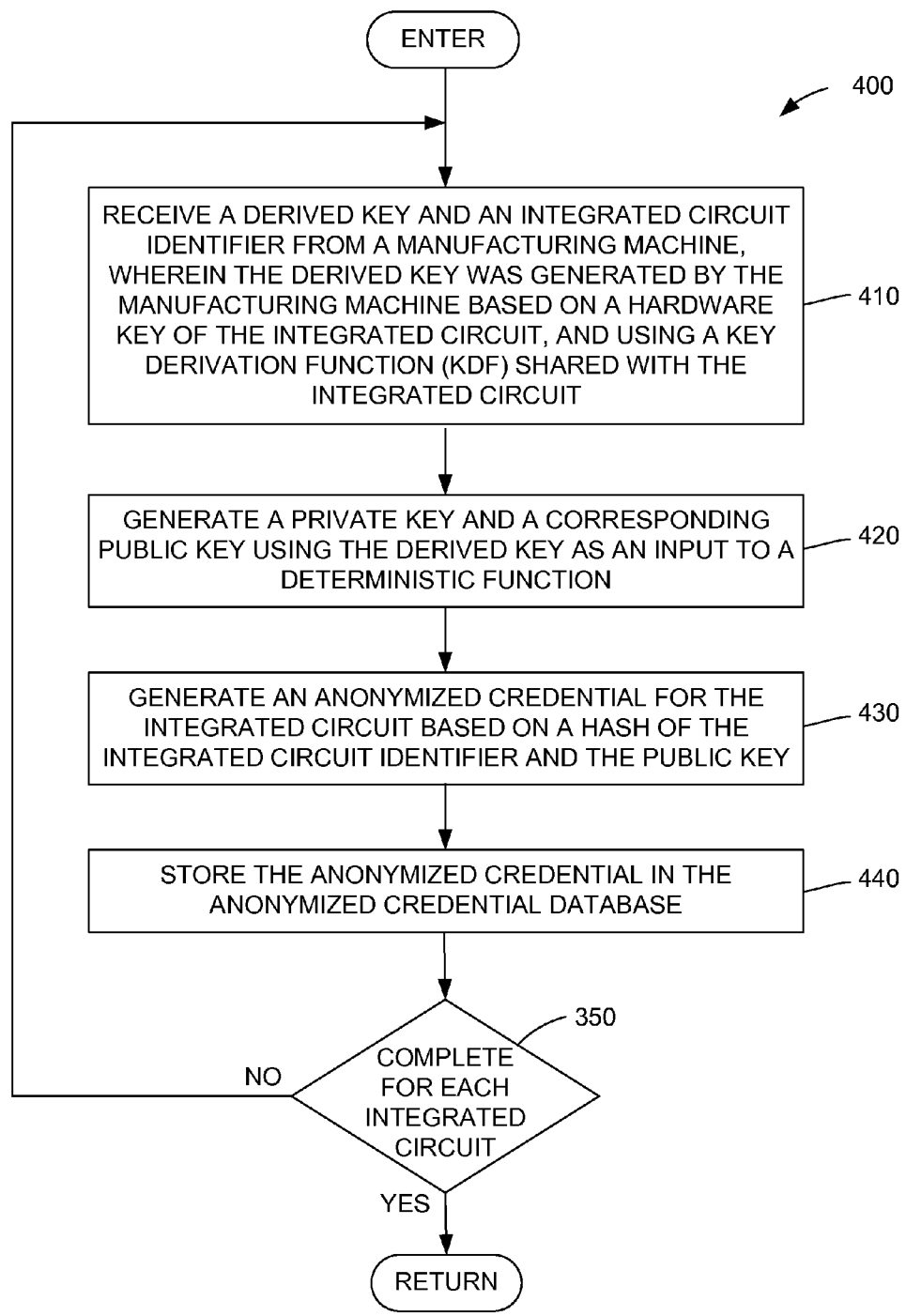
FIG. 4 is a flow diagram a method for providing an anonymized credential database for a plurality of integrated circuits.

With reference to FIG. 4, another aspect of the invention may reside in a method 400 for providing an anonymized credential database 40 for a plurality of integrated circuits 10, comprising: for each integrated circuit of the plurality of integrated circuits; receiving, by a manufacturer 50, a derived key and an integrated circuit identifier from a manufacturing machine 20, wherein the derived key was generated by the manufacturing machine based on a hardware key of the integrated circuit, and using a key derivation function (KDF) shared with the integrated circuit; generating, by the manufacturer, a private key and a corresponding public key using the derived key as an input to a deterministic function; generating, by the manufacturer, an anonymized credential for the integrated circuit based on a hash of the integrated circuit identifier, the public key, and, optionally, a database distinguishing salt (S2); and storing, by the manufacturer, the anonymized credential in the anonymized credential database 40.

In more detailed aspects of the invention, the method may further comprise: providing the anonymized credential database 40 to a partner service 30 for authenticating a public key provided to the partner service by an integrated circuit 10, and discarding, by the manufacturer 50, each private key before providing the anonymized credential database. Also, the private key and the corresponding public key may be generated further using a partner salt 60 as an input to the deterministic function. The hardware key may be only known to a secure zone of the integrated circuit and to the manufacturing machine.

With reference to FIG. 6, the manufacturer 50 may use a computer 600 that includes a processor 610, a storage medium 620 such as memory and/or a disk drive, a display 630, an input 640 such as a keypad, and a network/internet connection 650.

Another aspect of the invention may reside in a station (e.g., computer 600), comprising: means (e.g., processor 610) for receiving a derived key and an integrated circuit identifier from a manufacturing machine 20 for each integrated circuit 10 of a plurality of integrated circuits, wherein the respective derived key was generated by the manufacturing machine based on a hardware key of the respective integrated circuit, and using a key derivation function (KDF) shared with the integrated circuits; means (e.g., processor 610) for generating a respective private key and a corresponding respective public key using the respective derived key as an input to a deterministic function; means (e.g., processor 610) for generating an anonymized credential for the respective integrated circuit based on a hash of the respective integrated circuit identifier and the respective public key; and means (e.g., processor 610) for storing the respective anonymized credential for each integrated circuit in an anonymized credential database 40.

Another aspect of the invention may reside in a station (e.g., computer 600), comprising: a processor 610 configured to: receive a derived key and an integrated circuit identifier from a manufacturing machine 20 for each integrated circuit 10 of a plurality of integrated circuits, wherein the respective derived key was generated by the manufacturing machine based on a hardware key of the respective integrated circuit, and using a key derivation function (KDF) shared with the integrated circuits; generate a respective private key and a corresponding respective public key using the respective derived key as an input to a deterministic function; generate an anonymized credential for the respective integrated circuit based on a hash of the respective integrated circuit identifier and the respective public key; and store the respective anonymized credential for each integrated circuit in an anonymized credential database 40.

Another aspect of the invention may reside in a computer-readable medium (e.g., storage medium 620), comprising: code for causing a computer 600 to receive a derived key and an integrated circuit identifier from a manufacturing machine 20 for each integrated circuit 10 of a plurality of integrated circuits, wherein the respective derived key was generated by the manufacturing machine based on a hardware key of the respective integrated circuit, and using a key derivation function (KDF) shared with the integrated circuits; code for causing a computer 600 to generate a respective private key and a corresponding respective public key using the respective derived key as an input to a deterministic function; code for causing a computer 600 to generate an anonymized credential for the respective integrated circuit based on a hash of the respective integrated circuit identifier and the respective public key; and code for causing a computer 600 to store the respective anonymized credential for each integrated circuit in an anonymized credential database 40.

The KDF may be selected from the ones described in NIST SP 800-108 (e.g., one in counter mode, one in feedback mode, or any other one). In addition, a suitable KDF may be selected from ISO-18033-2 (KDF1, KDF2, KDF3, KDF4). Note that KDF1 and KDF2 in ISO-18033-2 are similar to the counter mode KDF in NIST SP 800-108. Also, KDF2 in ISO-18033-2 is the same as the KDF based on concatenation algorithm in Section 7.7.2 of ANSI X9.42 [AX942]. The input to the KDF may be the IC ID concatenated with the HW key, or an encryption thereof.

The deterministic function may be selected based on several components. A pseudorandom number generator (PRNG) may be used directly with elliptic curve cryptography (ECC) to deterministically generate the private key from which the corresponding public key is derived. Alternatively, an RSA key generation technique may be used. If additional keys are needed, the derived key may be encrypted with several distinguishing values used as keys, several distinguishing values may be encrypted using the derived key, or other similar functions of two inputs may be used. One input may be the derived key, and the other input may be one of several distinguishing values, to get more seeds for the PRNG. For each one of these seeds, elliptic curve cryptography may be performed, or, alternatively, the RSA key generation technique may be performed. If only one key pair is needed, one distinguishing value may be used, or only the derived key may be used, as the seed. Also, the PRNG seed may be based on the derived key (or derived key concatenated with a distinguishing value) concatenated with the partner seed, or an encryption thereof.

Several pseudo random number generators (deterministic) may be used, e.g., AES in counter mode, and other PRNGs in NIST Special Publication 800-90A. The seed for the PRNG may be the result of the previous step. For ECC, the output of this function is used to generate the secret key directly. If the result is a zero or another invalid value (very rare), the PRNG is commanded to generate another value. For RSA, the PRNG may be used as the source or "random bits" in the RSA key generation technique. An RSA key generation techniques is NIST Special Publication 800-56B, or simplifications thereof.

With reference to FIG. 1, a wireless remote station (RS) 102 (e.g. a mobile station MS) may communicate with one or more base stations (BS) 104 of a wireless communication system 100. The wireless communication system 100 may further include one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. The wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable median includes both non-transitory computer-readable storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for providing a public key for authenticating an integrated circuit, comprising:
   obtaining, by the integrated circuit, a hardware key and an integrated circuit identifier for the integrated circuit;
   storing the hardware key and the integrated circuit identifier in fuses of the integrated circuit;
   generating, by the integrated circuit, a derived key based on the hardware key using a key derivation function (KDF) shared with a manufacturing machine;
   generating, by the integrated circuit, a private key and a corresponding public key using the derived key as an input to a deterministic function; and
   providing, by the integrated circuit, the corresponding public key and the integrated circuit identifier to a partner service for authentication of the integrated circuit using an anonymized credential database to avoid storing the derived key in fuses of the integrated circuit during manufacturing, wherein the anonymized credential database includes hash values associated with a plurality of integrated circuits, and the hash values include a hash value associated with the public key of the integrated circuit.

2. The method of claim 1, wherein the private key and the corresponding public key are generated further using a partner salt as an input to the deterministic function.

3. The method of claim 1, wherein the hardware key is only known to a secure zone of the integrated circuit and to the manufacturing machine.

4. An integrated circuit, comprising:
   means for obtaining a hardware key and an integrated circuit identifier;
   means for storing the hardware key and the integrated circuit identifier in fuses of the integrated circuit;
   means for generating a derived key based on the hardware key using a key derivation function (KDF) shared with a manufacturing machine;
   means for generating a private key and a corresponding public key using the derived key as an input to a deterministic function; and
   means for providing the corresponding public key and the integrated circuit identifier to a partner service for authentication of the integrated circuit using an anonymized credential database to avoid storing the derived key in fuses of the integrated circuit during manufacturing, wherein the anonymized credential database includes hash values associated with a plurality of integrated circuits, and the hash values include a hash value associated with the public key of the integrated circuit.

5. The integrated circuit of claim 4, wherein the private key and the corresponding public key are generated further using a partner salt as an input to the deterministic function.

6. The integrated circuit of claim 4, wherein the hardware key is only known to a secure zone of the integrated circuit and to the manufacturing machine.

7. An integrated circuit, comprising:
   a processor configured to:
      obtain a hardware key and an integrated circuit identifier;
      store the hardware key and the integrated circuit identifier in fuses of the integrated circuit;
      generate a derived key based on the hardware key using a key derivation function (KDF) shared with a manufacturing machine;
      generate a private key and a corresponding public key using the derived key as an input to a deterministic function; and
      provide the corresponding public key and the integrated circuit identifier to a partner service for authentication of the integrated circuit using an anonymized credential database to avoid storing the derived key in fuses of the integrated circuit during manufacturing, wherein the anonymized credential database includes hash values associated with a plurality of integrated circuits, and the hash values include a hash value associated with the public key of the integrated circuit.

8. The integrated circuit of claim 7, wherein the private key and the corresponding public key are generated further using a partner salt as an input to the deterministic function.

9. The integrated circuit of claim 7, wherein the hardware key is only known to a secure zone of the integrated circuit and to the manufacturing machine.

10. A method for providing an anonymized credential database for a plurality of integrated circuits, comprising:
    for each integrated circuit of the plurality of integrated circuits;

receiving, by a manufacturer, a derived key and an integrated circuit identifier from a manufacturing machine, wherein the derived key was generated by the manufacturing machine based on a hardware key of the integrated circuit, and using a key derivation function (KDF) shared with the integrated circuit;

generating, by the manufacturer, a private key and a corresponding public key using the derived key as an input to a deterministic function;

generating, by the manufacturer, an anonymized credential for the integrated circuit based on a hash of the integrated circuit identifier and the corresponding public key; and storing, by the manufacturer, the anonymized credential in the anonymized credential database, wherein the anonymized credential database does not include the integrated circuit identifier; and providing the anonymized credential database to a partner service for authenticating a public key provided to the partner service by an integrated circuit.

11. The method of claim 10, further comprising:
discarding, by the manufacturer, each private key before providing the anonymized credential database.

12. The method of claim 10, wherein the private key and the corresponding public key are generated further using a partner salt as an input to the deterministic function.

13. The method of claim 10, wherein the hardware key is only known to a secure zone of the integrated circuit and to the manufacturing machine.

14. The method of claim 10, wherein generating the anonymized credential is based on a hash of the integrated circuit identifier, the corresponding public key, and a database distinguishing salt.

15. The method of claim 1, wherein the deterministic function comprises a cryptographic deterministic function.

* * * * *